US005423716A

United States Patent [19]
Strasbaugh

[11] Patent Number: 5,423,716
[45] Date of Patent: Jun. 13, 1995

[54] WAFER-HANDLING APPARATUS HAVING A RESILIENT MEMBRANE WHICH HOLDS WAFER WHEN A VACUUM IS APPLIED

[76] Inventor: Alan Strasbaugh, 825 Buckley Rd., San Luis Obispo, Calif. 93401

[21] Appl. No.: 178,530

[22] Filed: Jan. 5, 1994

[51] Int. Cl.6 .............................. B23Q 3/08
[52] U.S. Cl. .................... 451/388; 451/287; 451/289; 269/21; 269/22
[58] Field of Search ............. 51/129, 131.1, 131.5, 51/131.3, 131.4, 235, 236, 237 R, 283; 269/20, 21, 22

[56] References Cited

U.S. PATENT DOCUMENTS

| | | |
|---|---|---|
| 4,669,226 | 6/1987 | Mandler ................. 51/235 |
| 4,844,143 | 7/1989 | Herbin et al. ............. 51/216 LP |
| 5,205,082 | 4/1993 | Shendon et al. ............ 51/283 R |

*Primary Examiner*—Bruce M. Kisliuk
*Assistant Examiner*—Eileen P. Morgan
*Attorney, Agent, or Firm*—Daniel C. McKown

[57] ABSTRACT

An apparatus for acquiring, holding, and releasing a wafer includes a soft resilient membrane that covers a horizontal backing plate. The lower face of the backing plate includes a number of recessed areas to which a vacuum can selectively be applied. To acquire a wafer, the wafer is elevated carefully until the upper side of the wafer contacts the lower side of the membrane. Next, a vacuum is applied to the recessed areas which sucks the resilient membrane into the recessed areas so that each recessed area becomes a suction cup that draws the wafer against the membrane. When the vacuum is replaced by ambient pressure, the resiliency of the membrane restores it to its original taut condition thereby releasing the wafer. The same apparatus can be used for uniformly polishing the lower face of the wafer by applying a pressurized fluid to the recessed areas during polishing, which causes the membrane to exert a uniform downward pressure on the wafer.

3 Claims, 2 Drawing Sheets

WAFER-HANDLING APPARATUS HAVING A RESILIENT MEMBRANE WHICH HOLDS WAFER WHEN A VACUUM IS APPLIED

BACKGROUND OF THE INVENTION

The present invention is in the field of semiconductor manufacturing and specifically relates to an apparatus for acquiring, holding, and releasing a semiconductor wafer attendant to a polishing process. A typical wafer is several inches in diameter and about 680 microns thick; one micron is 1 millionth of a meter.

The polishing process is carried out by a sophisticated, numerically-controlled machine that eliminates the need for intervention by the human operator of the machine.

A part of the polishing machine called the carrier remains positioned over the wafer and presses the wafer downwardly against a flat rotating polishing surface. In a typical polishing machine, the movement of the carrier is programmed to acquire a wafer from a first station, to transport the wafer to a polishing surface, to drive the wafer across the rotating polishing surface, to transport the wafer from the polishing surface to a second station, and to release the wafer at the second station. In the present application, the focus is on those parts of the apparatus that are used to acquire the wafer, to hold it during transport, and to release the wafer.

THE PRIOR ART

The classical way of apprehending and releasing wafers is the use of a vacuum head that includes a rigid perforated plate against which the wafer is drawn by applying a vacuum to a plenum lying behind (above) the perforated plate. This apparatus is analogous to a household vacuum cleaner. The wafer is released by removing the vacuum; i.e., by restoring atmospheric pressure to the plenum.

A companion application, filed simultaneously with the present application and titled "Wafer Carrier for Film Planarization" deals with a different aspect of the same polishing machine with which the present application is concerned. The companion application describes a polishing technique for removing material uniformly across the face of a wafer, and in particular for uniformly reducing the thickness of a thin coating that has previously been applied to a wafer. In that technique, the carrier is provided with a membrane which presses down with a uniform pressure against the upper surface of a wafer that is being polished. The uniform pressure results in a uniform removal of material from all portions of the surface being polished.

The use of the membrane has proven to be extremely useful in the polishing step, however the presence of the membrane was thought to preclude the use of a plurality of vacuum holes for picking up and releasing the wafer before and after the polishing step, respectively. If the membrane included a number of perforations, the pressurizing gas or fluid would escape through the perforations during the polishing step, which could lead to nonuniform results. The success of the membrane technique described in the companion application depends upon the membrane being imperforate, and this was believed to make it impossible to use a vacuum applied to a perforated plate for apprehending and releasing the wafers. The present application is concerned with the solution of this dilemma.

SUMMARY OF THE INVENTION

It is an objective of the present invention to provide apparatus for apprehending a wafer from above, for holding the wafer during transport, and for releasing the wafer at a desired destination.

It is a further objective of the present invention to provide an apparatus including an imperforate membrane for apprehending, holding, and releasing a wafer.

In accordance with the present invention, the upper side of an imperforate membrane lies against the lower face of a rigid backing plate. The lower face of the rigid backing plate includes a number of recessed areas which all communicate with a supply line or hose that is included in the carrier above the rigid backing plate. When a vacuum is applied to the hose, the vacuum is communicated to the recessed areas, drawing the membrane into the recessed areas which then serve as suction cups to hold the wafer against the membrane. When the vacuum is released, the membrane returns to its planar configuration because of its resiliency, thereby releasing the wafer. The application of a small positive pressure to the hose has been found to expedite release of the wafer.

The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

DETAILED DESCRIPTION OF THE PREFERRED EMBODIMENT

The present invention is part of a wafer polishing machine, specifically, the carrier. The function of the carrier is to acquire a wafer from a first station, to transport the wafer to a polishing table, to hold the wafer while it is being polished, to transport the wafer to a second station, and to release the wafer at the second station. This operation is repeated under computer control so that a large number of wafers can be polished serially without the need for intervention by a human operator. More specifically, the present invention relates to the acquisition, holding, and releasing of a wafer by the carrier.

Figure 1:
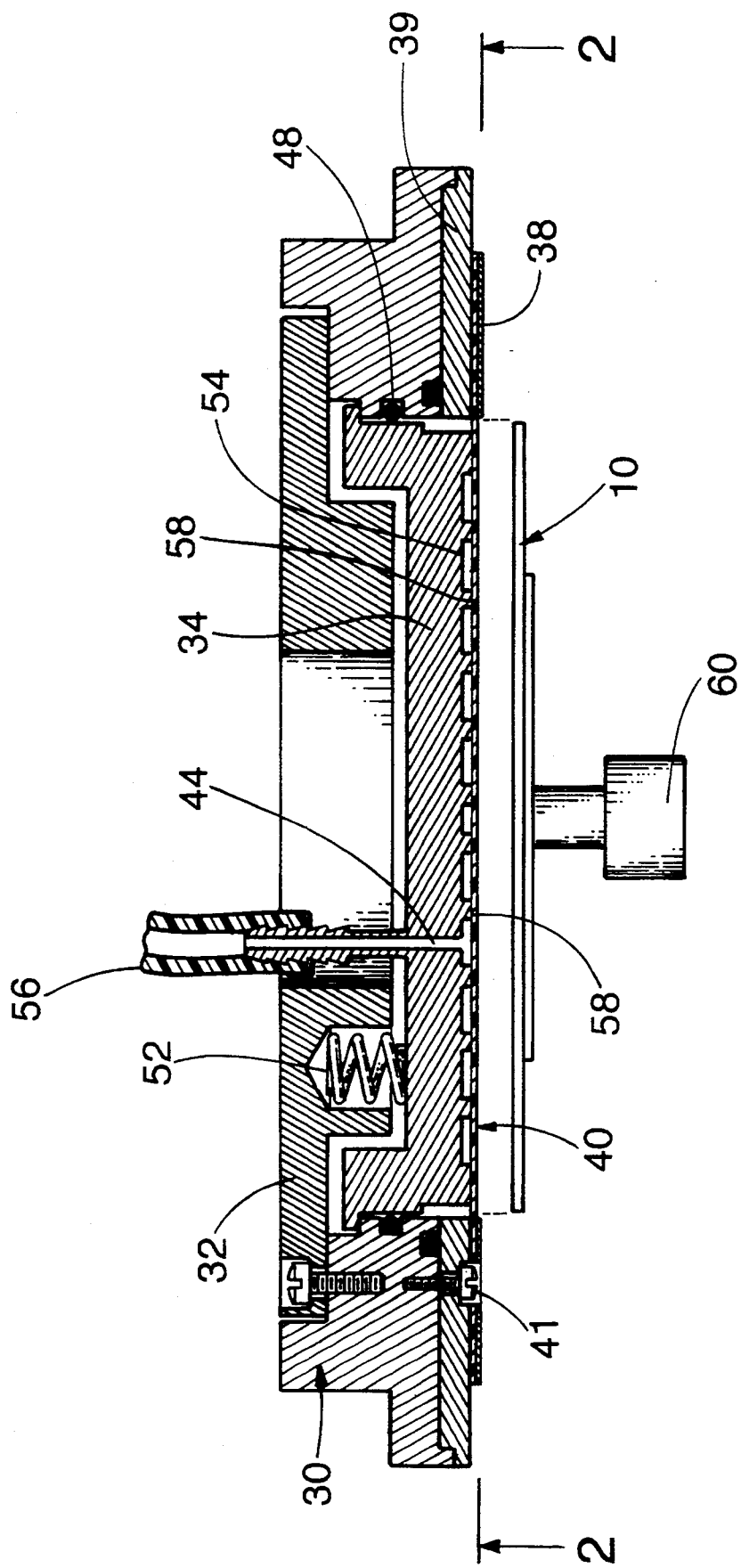
FIG. 1 is a side elevational view in cross section showing the carrier portion of a polishing machine in accordance with the present invention.

As best seen in FIG. 1, the carrier includes a ring-like part 30, a disk-like part 32, and a floating piston 34. The floating piston 34 is capable of limited vertical movement with respect to the ring-like part 30, and in FIG. 1 the floating piston 34 is shown at the lower limit of its travel. The ring-like part 30 is connected to the lower end of an arm (not shown) which serves to move the carrier laterally across the polishing surface, which rotates about a vertical axis.

The inside diameter of the washer 38 is slightly larger than the outside diameter of the wafer 10, so that the wafer 10 will fit loosely inside the washer 38. In this manner the wafer is held captive within the washer 38 as the polishing surface rotates and as the carrier moves laterally. The periphery of the lower side of the membrane 40 is bonded to the washer 38, and then the periphery of the opposite side of the membrane is bonded to the thicker washer-like part 39, which in turn is fastened to the ring-like part 30 by screws, of which the screw 41 is typical.

In a preferred embodiment, the membrane is several hundred microns in thickness and is composed of a synthetic rubber. As can be appreciated by workers in the art, a membrane this thin is quite pliable and is utterly lacking in stiffness.

The carrier includes a floating piston 34. As can be seen in FIG. 1, the floating piston is movable from a lower position shown in FIG. 1, which is determined by a shoulder on the ring-like part 30, to an upper position determined by the disc-like part 32.

When a pressurized fluid is applied through the flexible tube 56, the pressurized fluid flows through the passage 44 to the recessed regions in the lower face 58 of the floating piston 34, of which the recessed region 54 is typical. The pressurized fluid urges the membrane 40 downwardly away from the lower face 58 of the floating piston 34. At the same time, the pressurized fluid pushes the floating piston upward; the pressure used is great enough to overcome the weight of the floating piston, the downward force of the compression springs, of which the spring 52 is typical, and the friction of the O-ring 48, and therefore the floating piston is driven upward until it encounters the disc-like part 32.

When the pressure is released so that atmospheric pressure obtains within the flexible tube 56, the force of the springs 52 and the weight of the floating piston 34 overcome the friction of the O-ring 48 and permit the floating piston to return to its lower limit position in which the lower face 58 of the floating piston bears lightly against the membrane 40.

The acquisition maneuver begins with the floating piston in its lower limit position and with the pressure in flexible tube 56 relieved to atmospheric pressure. An air piston 60 beneath the wafer 10 gently elevates the wafer until it bears lightly against the lower side of the membrane 40. Next, a vacuum is applied to the flexible tube 56, and it draws away the fluid from the recessed regions 54 and the passage 44, and pulls the membrane tightly against the lower face 58 of the floating piston, causing the membrane to make a sealing contact with the lower face 58. Continued application of the vacuum then sucks the membrane into the recessed regions in the lower face 58. The wafer remains substantially planar, so that reduced pressure areas are produced between the lower surface of the membrane and the upper surface of the wafer at those areas where the membrane has been sucked into the recessed regions. The atmospheric pressure on the lower side of the wafer opposite the recessed regions is therefore not countered by a corresponding pressure on the upper side of the wafer, and the unbalanced pressure holds the wafer to its position against the membrane. The wafer has thus been acquired, and may be held in this position indefinitely.

Thereafter, the carrier transports the wafer to the polishing station and the carrier is lowered until the lower side of the wafer rests on the polishing surface.

Next, pressurized fluid is applied to the flexible tube 56. This causes the floating piston to be driven to its upper limit position as discussed above, and causes the membrane to exert a uniform downward pressure against the upper face of the wafer, which in turn causes the lower face of the wafer to push against the polishing surface 36 with a pressure that is uniform at all portions of the lower face of the wafer. This results in uniform removal of material from the lower face of the wafer as described in the companion application referred to above which is incorporated by reference herein.

After a predetermined time the rotation of the polishing surface is stopped, and it is time for the carrier to acquire the wafer again so that the polished wafer can be transported to a second station. The acquisition is again accomplished by applying vacuum to the flexible tube 56. The recessed areas act as suction cups to hold the wafer against the membrane, which in turn lies against the lower surface of the floating piston.

When the second station has been reached, it is time for the carrier to release the wafer, and this is accomplished by applying a lightly pressurized fluid to the tube 56. One might think that merely restoring atmospheric pressure to the tube 56 would be sufficient, but is has been found that the close contact between the upper surface of the wafer and the lower surface of the membrane limits the rate at which air can flow between them, making release slow and unpredictable. Therefore, in the best mode of practicing the invention, a small positive pressure is applied to the tube 56, to free the wafer from the membrane. The release having been effected, the carrier returns to the first station to acquire the next wafer.

It is noted that the main reason the floating piston is movable instead of fixed in its lower limit position is that during the polishing phase the lower side of the floating piston would act as a rigid pressing plate pressing against the wafer. As discussed at length in the companion application, the use of a rigid pressing plate results in nonuniform removal of material from the lower surface of the wafer, which is contrary to the purpose of the polishing. However, if no polishing is to be performed and if the apparatus is used merely to acquire, transport, and release articles having a planar surface, then the floating piston could be replaced by a backing plate fixed in the carrier.

Figure 2:
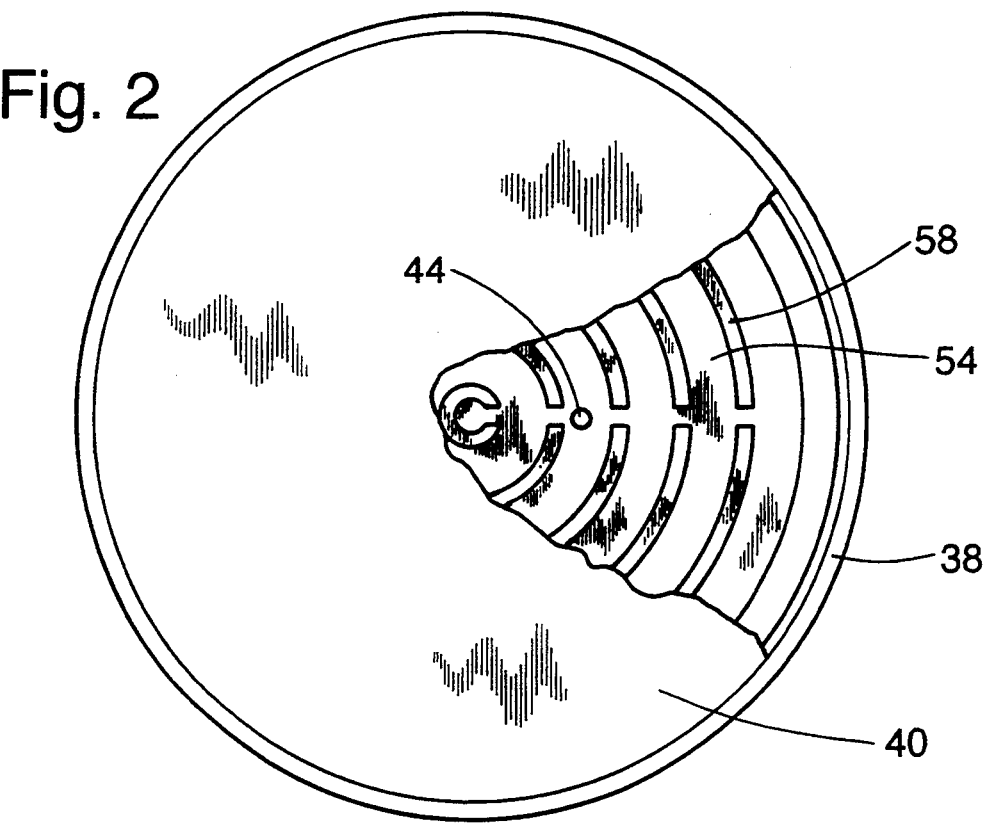
FIG. 2 is a bottom plan view in the direction 2—2 indicated in FIG. 1, with the membrane partially cut away.

FIG. 2 is a bottom plan view in the direction 2—2 indicated in FIG. 1. It shows the pattern of the recessed areas employed in the preferred embodiment, namely, a plurality of concentric annular recessed areas.

Figure 3:
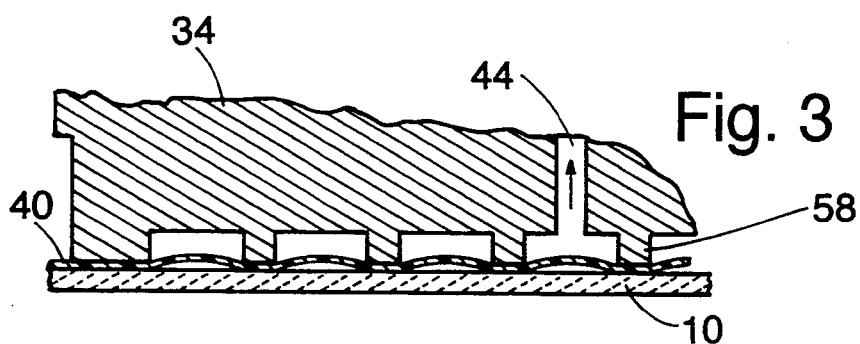
FIG. 3 is a side elevational cross sectional view of the carrier showing the membrane when a vacuum is applied; and, FIG. 4 is a side elevational cross sectional view of the carrier showing the membrane after the vacuum has been relieved.

FIG. 3 is a side elevational cross sectional view showing how the membrane 40 is sucked into the recessed regions shown in FIG. 2 when a vacuum is applied to the passage 44.

Figure 4:
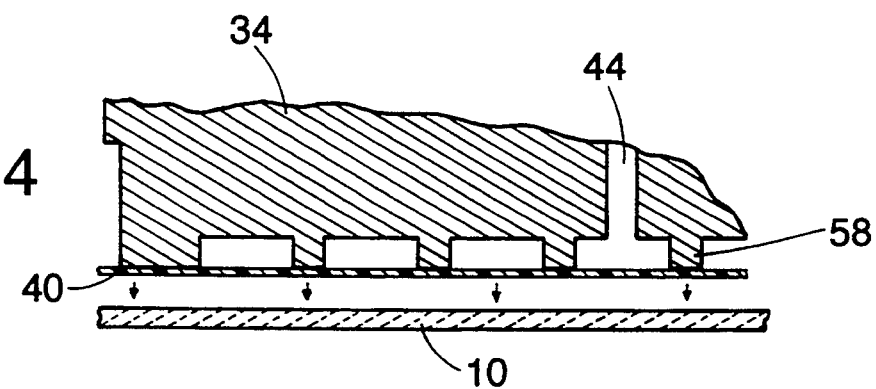

FIG. 4 is a side elevational cross sectional view showing the membrane restored to its flat configuration when atmospheric pressure obtains in the passage 44.

Thus, there has been described a wafer handling apparatus for acquiring, holding during transport, and releasing a wafer. In the preferred embodiment a soft imperforate synthetic rubber membrane is drawn tautly across the lower face of a floating piston or backing plate that includes a number of recessed areas. The recessed areas communicate with a source of vacuum, and when the vacuum is applied, the membrane is sucked into the recessed areas, so that each recessed area becomes a suction cup that draws the wafer against the membrane which is drawn against the lower face of the floating piston or backing plate. During a polishing operation, a pressurized fluid instead of a vacuum is applied, in which case the membrane exerts a uniform downward pressure on the upper face of the wafer so that the entire lower face of the wafer will be polished uniformly.

The foregoing detailed description is illustrative of several embodiments of the invention, and it is to be understood that additional embodiments thereof will be obvious to those skilled in the art. The embodiments described herein together with those additional embodiments are considered to be within the scope of the invention.

What is claimed is:

1. Apparatus for acquiring, holding and releasing an article having a planar surface, comprising in combination:
   a carrier having a lower side and having a bore extending vertically into said carrier from said lower side;
   a floating piston positioned within said bore for limited sliding vertical movement within said bore;
   sealing means between said bore and said floating piston;
   said floating piston including a planar lower surface;
   a recessed region within said floating piston;
   an aperture through the planar lower surface of said floating piston;
   a resilient membrane covering said aperture and separating the space inside said recessed region from the space below said resilient membrane; and,
   means for selectively applying a vacuum and a pressurized fluid to said recessed region.

2. A method for acquiring, holding, and releasing an article having a planar surface, comprising the steps of:
   providing a carrier that includes a planar surface covered by a resilient membrane, the planar surface including recessed regions into which the resilient membrane is sucked when a vacuum is applied to the recessed regions;
   bringing the planar surface of the article to be acquired into face-to-face contact with the resilient membrane;
   applying a vacuum to the recessed regions to suck the resilient membrane into the recessed regions leaving voids opposite the recessed regions between the resilient membrane and the article which function as suction cups to hold the article to the carrier; and,
   applying a pressurized fluid to the recessed regions to release the article from the carrier.

3. Apparatus for acquiring, holding, and releasing an object having an upwardly-facing planar surface, said apparatus comprising in combination:
   a carrier including a backing plate having a downwardly-facing generally-planar surface;
   a recessed region extending into the generally-planar surface of the backing plate;
   a resilient membrane covering the generally-planar surface of the backing plate;
   first means for bringing the upwardly-facing planar surface of the object into contact with said resilient membrane below said recessed region;
   second means for selectively applying a vacuum to said recessed region so as to draw said resilient membrane into said recessed region, producing a reduced pressure area between said resilient membrane and the upwardly-facing planar surface of the object, which reduced pressure area serves as a suction cup to retain the object; and,
   third means for selectively applying fluid under pressure to said recessed region to release the object.

* * * * *